Figure 1:

United States Patent [19]

Hocker et al.

[11] Patent Number: 4,481,312
[45] Date of Patent: Nov. 6, 1984

[54] SHEET STRUCTURES AND FIBERS CONTAINING BURR-SHAPED OR FIBROUS, DOPED POLYACETYLENE PARTICLES AND PROCESS FOR THE PRODUCTION THEREOF

[75] Inventors: Jürgen Hocker, Bergisch-Gladbach; Rudolf Merten, Leverkusen; Bernd Willenberg, Bergisch-Gladbach, all of Fed. Rep. of Germany

[73] Assignee: Bayer Aktiengesellschaft, Leverkusen, Fed. Rep. of Germany

[21] Appl. No.: 362,093

[22] Filed: Mar. 26, 1982

[30] Foreign Application Priority Data

Apr. 2, 1981 [DE] Fed. Rep. of Germany ....... 3113329

[51] Int. Cl.$^3$ .......................... C08L 49/00; C08J 5/02; C08K 3/02; C08K 3/16
[52] U.S. Cl. ....................................... 524/40; 524/37; 525/146; 525/202; 525/238; 525/239; 526/285; 523/202; 523/223
[58] Field of Search ....................... 264/205, 207, 182; 524/31, 37, 40; 525/146, 238, 239, 202; 526/285; 523/200, 202, 220, 223

[56] References Cited

U.S. PATENT DOCUMENTS

| | | | |
|---|---|---|---|
| 3,816,374 | 6/1974 | White | 526/285 |
| 3,933,722 | 1/1976 | Krutchen | 526/285 |
| 4,224,217 | 9/1980 | Dennis et al. | 525/146 |
| 4,277,588 | 7/1981 | Naarmann et al. | 526/285 |
| 4,384,090 | 5/1983 | Hocker et al. | 526/169.2 |
| 4,397,971 | 8/1983 | Hocker et al. | 524/40 |

FOREIGN PATENT DOCUMENTS

| | | |
|---|---|---|
| 45905 | 2/1982 | European Pat. Off. |
| 45908 | 2/1982 | European Pat. Off. |
| 2072197 | 9/1981 | United Kingdom |

Primary Examiner—John Kight
Assistant Examiner—Nathen M. Nutter
Attorney, Agent, or Firm—Connolly and Hutz

[57] ABSTRACT

A process for the production of sheet structure, including fibres from plastics solutions containing deped, burr-shaped or fibrous polyacetylene particles, in which process the solution is shaped to form a sheet and the solvent is removed and the sheet structure thus prepared.

6 Claims, 4 Drawing Figures

SHEET STRUCTURES AND FIBERS CONTAINING BURR-SHAPED OR FIBROUS, DOPED POLYACETYLENE PARTICLES AND PROCESS FOR THE PRODUCTION THEREOF

It is known to produce polyacetylenes by the polymerisation of acetylene using organometallic mixed catalysts (J. Polym. Sci. Vol. 12, pages 11–20). It is also known to dope crystalline films of polyacetylene by a treatment using gaseous electron acceptor dopant additives to improve the electrical conductivity of the films (U.S. Pat. No. 4,222,903).

An object of the present invention is to provide a process for the production of sheet structures, such as coatings and impregnations, and fibres, from plastics solutions containing doped, burr-shaped or fibrous polyacetylene particles, wherein after shaping, the solvent is removed. Another object of the present invention is to provide sheet structures, and fibres from plastics containing from 0.01 to 99%, by weight, preferably from 0.1 to 20%, by weight, more preferably from 0.5 to 5%, by weight, of doped polyacetylene particles, optionally combined with other fillers.

The starting material for the present invention is a suspension of polyacetylene particles in the form of small fibrous balls or "burrs". The structure of the particles is shown in FIG. I (enlargement 1:105); it is essential to the present invention. This suspension is obtained by introducing gaseous acetylene at temperatures of from $-100°$ to $+80°$ C. with agitation into a solution of an organometallic mixed catalyst in an organic solvent, until a maximum of 30 g of polyacetylene has formed per liter of solution. The solvent for the catalyst which acts simultaneously as the suspending agent for the polyacetylene particles is usually an aliphatic or aromatic hydrocarbon which may be halogenated, for example benzene, toluene, chlorobenzene, tetralin, methylene chloride or chloroform.

The organometallic mixed catalyst or Ziegler catalyst is a reaction product of, on the one hand, compounds of heavy metals of Groups IVb, Vb, VIb, VIIb, and VIII of the Periodic Table (Handbook of Chemistry and Physics, 47th edition (1966), p. B 3—Chem. Rubber Company, Cleveland, Ohio/USA), and, on the other hand, aluminium alkyls or aluminium alkyl halides. Ziegler catalysts are known.

For the production of polyacetylene particles, it is preferred to use catalysts obtained from the reaction of from 0.05 to 0.2 mols of vanadium compound corresponding to the following general formula:

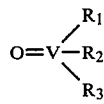

wherein $R_1$ represents halogen (in particular chlorine); and $R_2$ and $R_3$ independently represents halogen (in particular chlorine) or $OR_5$ wherein $R_5$ represents $C_1$–$C_{20}$ alkyl, or $C_1$–$C_{20}$ cycloalkyl; with from 0.1 to 20 mols, preferably from 1 to 10 mols; of: $Al(R_4)_3$, $AlX(R_4)_2$, $AlX_2(R_4)$, $Al_2X_3(R_4)_3$; wherein $R_4$ represents $C_1$–$C_{12}$ alkyl, preferably methyl, ethyl, propyl, isopropyl, isobutyl or octyl; and X represents halogen.

Vanadium compounds which are particular suitable include the following:

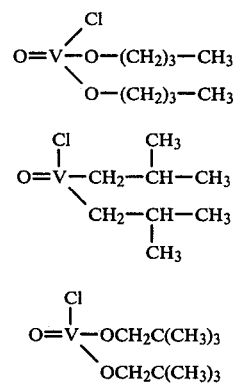

Aluminium alkyls which are particularly suitable include the following: triethyl aluminium, tripropyl aluminium, triisopropyl aluminium, tributyl aluminium, triisobutyl aluminium and trioctyl aluminium.

Solvents which are particularly suitable include hydrocarbons such as benzene, toluene, hexane, cyclohexane, tetralin or decalin, and halogenated hydrocarbons, such as methylene chloride, chloroform or chlorobenzene.

The catalysts can be prepared in a known manner by reacting the vanadium compound and the aluminium compound in the solvent at temperatures of from $-100°$ to $+30°$ C. Solutions which contain from 5 to 100 mmols of aluminium per liter of solvent are generally used for the subsequent polymerisation process. Acetylene is introduced into this solution in the absence of oxygen at temperatures of from $-100°$ to $+80°$ C., preferably from $-80°$ to $+20°$ C. A suspension of polyacetylene is produced during this process. Under a microscope, the suspended particles appear as small burrs having a diameter of from 0.01 to 1.0 mm.

The thus-obtained suspensions of polyacetylene particles generally contain from 0.01 to 30 g per liter, preferably from 0.1 to 10 g per liter, of polyacetylene particles. Before treating this suspension further, it may be advantageous to homogenise it mechanically once again, for example, using an "Ultraturrax", and the fibrous structure of the particles should be maintained during this operation.

Before doping, the Ziegler catalyst in these suspensions must initially be deactivated or removed. This may be effected in conventional manner by adding alcohols, such as methanol, ethanol, mixtures thereof, or by shaking with aqueous acids, for example hydrochloric acid. However, it is also possible to exchange the suspending agent in which the catalyst is dissolved. This may be effected when it is a matter of removing the catalyst components or if the suspending agent which is present is unsuitable for further processing.

For doping, the dopant additive is added to the suspension as such or in solution. The process may be carried out at temperatures of from $-78°$ to $+100°$ C., preferably from 10° to 30° C. The quantity of dopant additive is generally from $1 \times 10^{-5}$ to $4 \times 10^{-1}$ mols, preferably from $1 \times 10^{-3}$ to $2 \times 10^{-1}$ mols, per gram equivalent of —CH-units (=13 g of polyacetylene).

Excess dopant additive may remain in the suspension, or can be removed, e.g., by further exchange of the suspending agent.

Examples of dopants are as follows: chlorine, bromine, iodine, ICl, IBr, halogen compounds, such as $AsF_5$, $SbF_5$, $SbCl_5$, $AsCl_5$, $PF_5$ or $POF_3$, oxides, such as NO, $NO_2$, conc. $H_2SO_4$, $H_2O_2$, $CrO_3$ or oxygen, ozone or peroxy compounds.

Strong reducing agents are mainly used for n-doping. Examples of such reducing agents are as follows: alkali metals or the naphthalides thereof, such as sodium, potassium or sodium naphthalide, or electron donors, such as amines.

It is also possible to dissolve plastics in the suspension. Since virtually any suspending agent may be selected by exchange (polyacetylene is insoluble in all organic solvents), virtually any plastics may also be dissolved.

Examples of such plastics are as follows: polycarbonates, cellulose esters, polyamides, styrene- homo- and co-polymers, polyvinyl halides such as polyvinyl chloride, acrylonitrile, polyesters and polyurethanes. Plastics precursors, for example, epoxy resins may also be dissolved or polyisocyanate/polyol (or polyamine) mixtures may be directly used (polyacetylenes may be suspended in the polyol). The polymer solutions may also contain conventional additives, such as other fillers, stabilizers, flow agents, pigments, plasticizers, wetting agents and antioxidants. By removing the solvent, sheet structures, such as films, coatings, and impregnations as well as fibres can be produced in conventional manner from these plastics solutions containing burr-shaped or fibrous polyacetylene particles, the solutions generally containing from 0.01 to 99%, by weight, of polyacetylene, preferably from 0.1 to 20%, by weight, more preferably from 0.5 to 5%, by weight, based on the plastics. It may be advantageous in some cases to add other conductivity-increasing materials, such as carbon black, graphite, polymeric or low molecular weight organic conductors or metals in the form of powders, fibres or flakes.

The products according to the present invention containing burr-shaped or fibrous doped polyacetylene have very good mechanical properties. The electrical conductivity may be varied within wide limits. It is particularly suitable to add doped polyacetylene to obtain antistatic properties of plastics.

For example, by spraying a suspension of the doped polyacetylene particles, containing a plastics (e.g. polycarbonate or polybutadiene), in an organic solvent, cohesive coatings may be produced on different substrates. The coatings have thicknesses of from 0.1 μm, which may be varied as desired. They adhere firmly, in particular to paper, plastics, glass and metals, and may be used, for example, for printed circuits.

Practical Examples

EXAMPLE 1

Preparation of the catalyst, polymerisation and processing 1.3 l of toluene are introduced into a 2 liter beaker equipped with a stirring apparatus and 300 ml of toluene are distilled off under a stream of nitrogen. With dry ice cooling, 4 ml (2 mmoles) of bis-(2,2-dimethylpropoxy)-vanadium oxychloride, 0.5 molar in toluene, and 20 ml (20 mmols) of triisobutyl aluminium, 1 molar in toluene, are added at $-78°$ C. During this addition, the apparatus is constantly under a stream of nitrogen. Pure acetylene is passed through at a rate of 10 l per hour for 1 hour, with stirring. The polyacetylene formed is precipitated.

It is in the form of pink-violet burr-shaped structures (FIG. 1) having a diameter of from about 0.05 to 0.5 mm. The thus-obtained suspension contains 4 g of polyacetylene per liter. The reaction is stopped using 0.5 g of 4-methyl-2,6-di-t-butylphenol (ionol), in 400 ml of absolute toluene and the reaction mixture is purged using nitrogen, the temperature rising to 20° C.

EXAMPLE 2

1000 ml of absolute methylene chloride are introduced into a 2 liter beaker equipped with a stirring apparatus. It is cooled to $-78°$ C., and 4.2 ml (12.5 mmols) of titanium tetrabutylate (100%) and 50 ml (50 mmols) of triisobutyl aluminium, 1 molar in methylene chloride, are added.

10 g of acetylene are passed through the catalyst solution at $-78°$ C. over a period of one hour with stirring and dark polyacetylene is precipitated. The reaction is stopped using a solution of 0.5 g of 4-methyl-2,6-di-t-butyl-phenol (ionol) in 5 ml of methanol and the temperature is allowed to rise to 20° C. under a stream of nitrogen. Under a microscope, the reaction mixture shows dark violet burr-shaped polyacetylene structures having a diameter of about 0.1 mm. The suspension contains 2.5 g of polyacetylene per liter.

EXAMPLE 3

A solution of 4 g of iodine in 100 ml of toluene is added, with stirring, at 20° C. to 1 liter of a polyacetylene suspension prepared according to Example 1 and the mixture is subsequently stirred for 2 hours at room temperature. The originally violet solution fades and a suspension containing doped burr-shaped polyacetylene particles is obtained.

EXAMPLE 4

A suspension which was prepared according to Example 2 was doped using a solution of 2.5 g of iodine in 100 ml of methylene chloride, analogously to Example 3.

EXAMPLE 5

Figure 3:
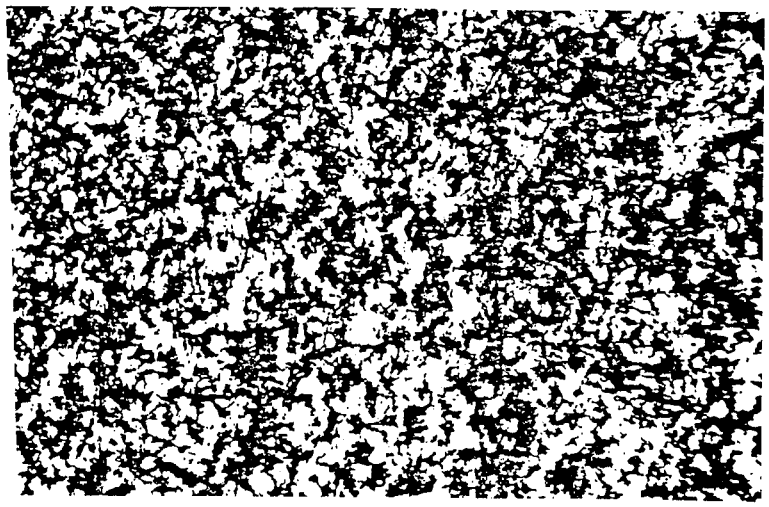

1.5 g of iodine-doped polyacetylene in 150 ml of methylene chloride (prepared analogously to Example 4) were added to a solution of 150 g of cellulose acetobutyrate (approx. 37% by weight of butyryl residues, 14% by wt. of acetyl residues and 1.2% by weight of OH) in 850 g of acetic acid butylester. The methylene chloride was removed under reduced pressure while adding acetic acid butylester. To the doped polyacetylene suspension containing cellulose acetobutyrate acetic acid butylester was added until the total weight was 1 kg. coating glass (FIG. 3), paper or plastics, antistatic coatings are produced having a surface resistance of $<10^7 \Omega$.

Lacquer suspensions containing 3 or 5% of iodine-doped polyacetylene, based on cellulose acetobutyrate, were prepared in analogous manner. The surfaces coated therewith showed surface resistances of $10^{+6}$ and $10^5 \Omega$.

EXAMPLE 6

A polyacetylene suspension according to Example 2 was doped using iodine according to Example 4. A polycarbonate solution is prepared from 0.5 g of iodine-doped polyacetylene in 50 g of methylene chloride and 50 g of an aromatic polycarbonate in 400 g of methylene chloride, in which polycarbonate solution is suspended iodine-doped polyacetylene in burr- or fibre form. The surfaces of glass, paper and plastics were coated with a layer of lacquer using this reaction mixture by the following methods:

(a) Lacquering using a brush,
(b) Dip-coating, and
(c) Spraying.

All the surfaces were antistatic and had surface resistances of $<10^{+9}\Omega$. Suitable coating compositions may also be prepared in analogous manner using reaction mixtures, the solids content of which is to 90% doped polyacetylene. They produce coatings having surface resistances of up to $10^1\Omega$.

EXAMPLE 7

Figure 2:

A 10% polycarbonate solution in methylene chloride prepared according to Example 6 and containing 1% by weight of iodine-doped polyacetylene (based on polycarbonate) is drawn out on a glass plate using a doctor blade into films having a wet thickness of 500 μm. After the solvent has evaporated, a black film remains which is 50μ thick and has a surface resistance of $10^9\Omega$, with unchanged mechanical properties (FIG. 2). The film may be seen in more detail in FIG. 2 (enlargement 50:1).

EXAMPLE 8

A film which was produced analogously to Example 7 and contains 3%, by weight, of iodine-doped polyacetylene had a surface resistance of $10^7\Omega$.

EXAMPLE 9

A film which was produced analogously to Example 7 and contains 5%, by weight, of iodine-doped polyacetylene has a surface resistance of $10^5\Omega$.

EXAMPLE 10

A polyacetylene suspension prepared according to Example 2 was doped according to Example 4.

1 liter of a methylene chloride suspension which contains 10 g of iodine-doped polyacetylene was mixed with 1.5 l of dimethyl formamide. Methylene chloride and dimethyl formamide were removed under vacuum until 1 kg remained.

Figure 4:

A solution of 990 g of polyacrylonitrile in 1856 g of dimethyl formamide was added to 1 kg of the thus-obtained suspension and a spinning solution was obtained after degassing. The burr-shaped doped polyacetylene particles are appropriately crushed into fibrous particles using an "Ultraturrax". This polyacrylonitrile/polyacetylene suspension may be spun into black fibres, the content of doped polyacetylene thereof amounting to about 1%, by weight. The fibres may be stretched to four times their length and are antistatic with good mechanical properties (FIG. 4). The surface resistance is $10^8\Omega$.

We claim:

1. A process for coating or impregnating a substrate which comprises
   (1) applying a coating composition to the substrate, said composition comprising solvent, a plastic material dissolved in the solvent, and polyacetylene particles which are doped and are burr-shaped or fibrous and
   (2) removing the solvent from the composition applied to the substrate.

2. A process according to claim 1, wherein the solvent and plastic comprise a solution of a cellulose ester, a polycarbonate, polyvinyl chloride or polyacrylonitrile in an inert organic solvent.

3. A process according to claim 1, wherein the coating composition contain an additional, conductivity increasing additive.

4. A coating composition comprising
   (1) an inert organic solvent,
   (2) a plastic material selected from cellulose ester, polycarbonate, polyvinyl chloride or polyacrylonitrile and
   (3) doped, burr-shaped or fibrous polyacetylene particles.

5. A coated article coated by the process according to claim 1 wherein the coating contains from 0.01 to 99% by weight of said doped, burr-shaped or fibrous particles.

6. The coated articles according to claim 5 wherein the coating contains 0.1 to 20% by weight of said polyacetylene particles and the plastic material is cellulose ester, polycarbonate, polyvinyl chloride or polyacrylonitrile.

* * * * *